United States Patent
Klein-Hitpass et al.

(10) Patent No.: US 10,837,558 B2
(45) Date of Patent: Nov. 17, 2020

(54) SEAL

(71) Applicant: Flender GmbH, Bocholt (DE)

(72) Inventors: Michael Klein-Hitpass, Wesel (DE); Oliver Bachler, Bocholt (DE); Ingo Kleidt, Duisburg (DE)

(73) Assignee: Siemens Aktiengesellschaft, Munich (DE)

( * ) Notice: Subject to any disclaimer, the term of this patent is extended or adjusted under 35 U.S.C. 154(b) by 219 days.

(21) Appl. No.: 16/072,829

(22) PCT Filed: Jan. 24, 2017

(86) PCT No.: PCT/EP2017/051380
§ 371 (c)(1),
(2) Date: Jul. 25, 2018

(87) PCT Pub. No.: WO2017/129543
PCT Pub. Date: Aug. 3, 2017

(65) Prior Publication Data
US 2019/0032787 A1 Jan. 31, 2019

(30) Foreign Application Priority Data

Jan. 26, 2016 (DE) .................. 10 2016 000 711
Mar. 11, 2016 (DE) .................. 10 2016 204 007

(51) Int. Cl.
*F16J 15/32* (2016.01)
*F16J 15/3292* (2016.01)
(Continued)

(52) U.S. Cl.
CPC ......... *F16J 15/3292* (2013.01); *F16C 33/805* (2013.01); *F16H 57/029* (2013.01);
(Continued)

(58) Field of Classification Search
CPC ...... F16J 15/326; F16J 15/3456; F16J 15/447; F16J 15/164; F16J 15/00; F16C 19/06; F16C 19/52; F16C 19/76
See application file for complete search history.

(56) References Cited

U.S. PATENT DOCUMENTS 3,652,180 A * 3/1972 Choquette ............. F04D 29/146
　　　　　　　　　　　　　　　　　　　　　415/113
3,799,634 A * 3/1974 Sernetz ............... F16C 33/7886
　　　　　　　　　　　　　　　　　　　　　384/480
(Continued)

FOREIGN PATENT DOCUMENTS

| CA | 2215174 A1 | 3/1998 |
| CN | 103883729 A | 6/2014 |

(Continued)

OTHER PUBLICATIONS

International Search Report issued by the European Patent Office in International Application PCT/EP2017/051380.
(Continued)

*Primary Examiner* — Vishal A Patel
(74) *Attorney, Agent, or Firm* — Henry M. Feiereisen LLC

(57) ABSTRACT

The invention relates to a seal arrangement for sealing a radial gap between an inner first component (8) and an outer second component (15) which can be rotated in relation to each other, the first component (8) being rotatable about an axis of rotation and the second component (15) being arranged coaxially to the first component (8). The seal arrangement comprises: a dynamic seal part (14) connected to the first component (8); a static seal part (15) connected to the second component (15); a first labyrinth seal (1) formed by a gap between a first section of opposing surfaces of the dynamic seal part (14) and the static seal part (15); and a leaf seal (2) which is radially arranged inside the first (Continued)

labyrinth seal (1). The invention is characterised in that the seal arrangement comprises a dust protection cover (3) connected to the second component (15), which is arranged radially outside the first labyrinth seal (1).

19 Claims, 5 Drawing Sheets

(51) Int. Cl.
*F16J 15/447* (2006.01)
*F16H 57/029* (2012.01)
*H02K 5/124* (2006.01)
*H02K 5/10* (2006.01)
*F16C 33/80* (2006.01)
*H02K 5/173* (2006.01)

(52) U.S. Cl.
CPC ............ *F16J 15/4476* (2013.01); *H02K 5/10* (2013.01); *H02K 5/124* (2013.01); *H02K 5/1732* (2013.01)

(56) References Cited

U.S. PATENT DOCUMENTS

| | | | |
|---|---|---|---|
| 5,833,372 A | 11/1998 | Nisley | |
| 7,637,665 B2* | 12/2009 | Cook | F16C 33/6622 |
| | | | 384/477 |
| 7,748,951 B2* | 7/2010 | Visintainer | F04D 29/049 |
| | | | 415/111 |
| 8,342,535 B2* | 1/2013 | Lattime | F16C 33/7813 |
| | | | 277/412 |
| 8,864,139 B2* | 10/2014 | Greca | F16J 15/3256 |
| | | | 277/409 |
| 10,302,133 B2* | 5/2019 | Song | F16C 33/7813 |
| 2008/0031556 A1* | 2/2008 | Heim | B60B 27/00 |
| | | | 384/448 |
| 2011/0291363 A1 | 12/2011 | Bartley | |
| 2014/0167366 A1 | 6/2014 | Yasuda et al. | |

FOREIGN PATENT DOCUMENTS

| | | |
|---|---|---|
| DE | 818530 C | 10/1951 |
| DE | 7422837 U | 12/1974 |
| DE | 7616806 U1 | 12/1976 |
| DE | 3708815 C1 | 9/1988 |
| DE | 102008023289 A1 | 11/2009 |
| DE | 102013012916 A1 | 3/2014 |
| WO | WO 2014048519 A1 | 4/2014 |
| WO | WO 2015105964 A1 | 7/2015 |

OTHER PUBLICATIONS

Handbuch "Gear Unit" BA 5010EN Jun. 2010 Siemens.
Prospekt "FAG SuperTac II Taconite Seals".
Handbuch "Belt conveyor gear unit" BA 5016 EN Jul. 2010 Siemens.

* cited by examiner

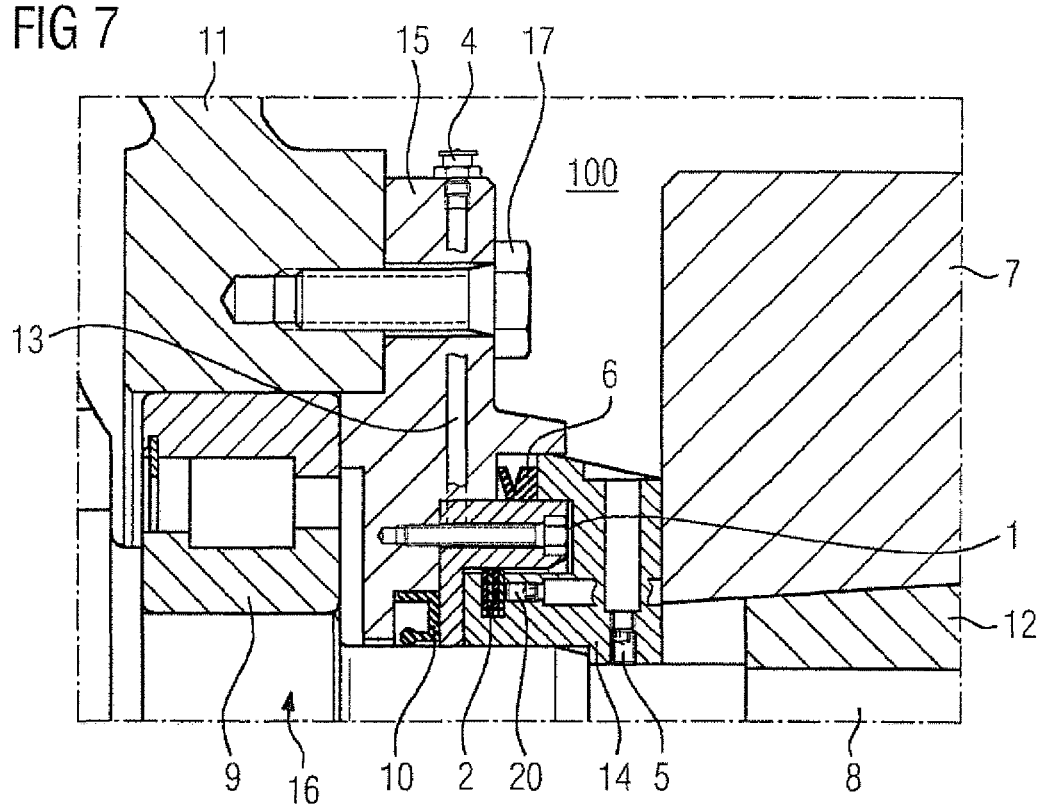
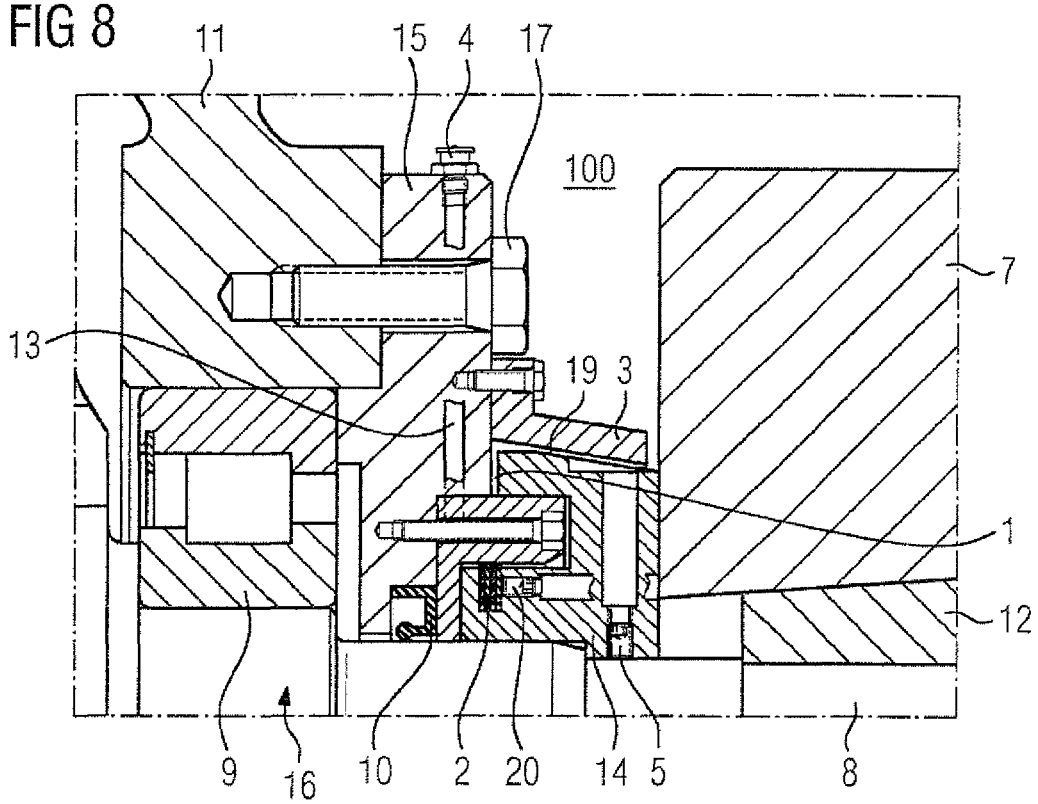

SEAL

CROSS-REFERENCES TO RELATED APPLICATIONS

This application is the U.S. National Stage of International Application No. PCT/EP2017/051380, filed Jan. 24, 2007, which designated the United States and has been published as International Publication No. WO 2017/129543 and which claims the priorities of German Patent Applications, Serial No. 10 2016 000 711.7, filed Jan. 26, 2016, and 10 2016 204 007.3, filed Mar. 11, 2016 pursuant to 35 U.S.C. 119(a)-(d).

BACKGROUND OF THE INVENTION

Seals are used in devices such as gears or motors in order to prevent the entry of dust and other undesired substances, e.g. water, into the inside of the devices. High demands are made on seals, in particular at points at which stationary and moving components of the devices adjoin one another.

The use of a combination of a labyrinth seal and a laminar seal as a seal between rotating and non-rotating components is known. Labyrinth seals are popular as protective seals because, as non-contact seals, they operate practically without any wear.

Such a known seal, comprising a labyrinth seal 1 and a laminar seal 2, is shown in FIG. 1, where it is arranged in the area of a gear drive shaft 8 in a gear 16. In this arrangement the laminar seal 2 is arranged downstream from the labyrinth seal 1 in the direction in which the dust enters. The labyrinth seal 1 is formed by a serpentine-shaped gap formed between a non-rotating component 15 of the gear 16, here: a bearing cover, and a component 14 rotating with the drive shaft 8.

The rotating component 14 is arranged on the drive shaft 8 of the gear 16 in a torsion-proof manner with the aid of setscrews 5. The setscrews 5 are locked with an adhesive, e.g. Loctite®. In addition the rotating component 14 is locked on the gear drive shaft 8 with an adhesive, e.g. Loctite®. On the side of the rotating component 14 facing away from the gear 16 a shrink disk 7 is installed over a conical ring section 12 on the gear shaft 8, so that a press-fit connection between the gear shaft 8 and a motor shaft not shown in the figure is formed.

The gear shaft 8 is supported with the aid of a rolling-element bearing 9 on the gear housing 11. The non-rotating component 15 is fastened to the gear housing 11 by means of a threaded bolt 17. The non-rotating component 15 has a lubrication channel 13, through which lubricating grease can be transported from a lubrication nipple 4 to the gap of the labyrinth seal 1. Arranged on the inner circumference of the non-rotating component 15 surrounding the gear shaft 8 is a shaft-sealing ring 10. Shaft sealing rings are classed as contact seals, which have a so-called lip or contact lip for sealing, which rests against a rotating component. The sealing lip of the shaft sealing ring 10 slides on the outer circumference of the gear shaft 8. This shaft sealing ring 10 primarily serves to prevent the oil to be found in the inside of the gear from escaping from the gear 16 along the gear shaft 8.

A laminar seal 2, which seals the labyrinth gap 1 in that it acts as an additional labyrinth seal, is inserted into the rotating component 14 at the radially inner, gear-side end of the labyrinth gap 1. This conventional seal arrangement shown in FIG. 1, comprising a labyrinth seal 1 and a laminar seal 2, is intended to protect the inside of the gear against the intrusion of undesired particles, in particular of dust particles, from the environment 100.

SUMMARY OF THE INVENTION

The object of the present invention is to provide an improved seal.

According to one aspect of the invention, the object is achieved by a seal arrangement for sealing a radial gap between an inner first component and an outer second component, which are rotatable relative to one another. The first component is rotatable about an axis of rotation and the second component is arranged coaxially to the first component. In this case the seal arrangement has a dynamic sealing part, which is connected to the first component, and the seal arrangement has a static sealing part, which is connected to the second component. The seal arrangement has a first labyrinth seal, which is formed by a gap between a first section of opposing surfaces of the dynamic sealing part and of the static sealing part. The seal arrangement has a laminar seal, which is arranged radially within the first labyrinth seal. The seal arrangement has a dust protection cover connected to the second component, which is arranged radially outside the first labyrinth seal.

Advantageous developments of the invention are the subject matter of the dependent claims.

The radial gap is a gap that separates two components radially from one another. The term "radial" relates to an axis of rotation of first and second component able to be rotated relative to one another. Preferably it involves an annular gap, which surrounds the inner first component in an annular shape and spaces it away from the outer second component.

The dynamic sealing part can be a rotatable ring, which rotates together with the inner first component about the axis of rotation and forms a rotating, i.e. a dynamic wall of the first labyrinth seal. The static sealing part forms a stationary, i.e. a static wall of the first labyrinth seal; the static sealing part can be a section of the second component and/or a separate component connected to the second component. It is possible for the static sealing part to be formed at least partly by a fastening ring, which serves to fasten a laminar seal to the second component; in this case the fastening ring can be installed on the second component by means of screw bolts.

The first labyrinth seal preferably has grease lubrication, i.e. grease, e.g. lithium grease, sealing the labyrinth gap, is pressed via a lubricating nipple and a lubricating channel connected thereto into the labyrinth seal. The grease filling continuously conveys outwards any contamination particles that may possibly have intruded.

The gap between the first section of opposing surfaces of the dynamic sealing part and of the static sealing part preferably runs at least in sections in the radial direction.

The laminar seal is arranged radially within the first labyrinth seal, in relation to the axis of rotation. The term "laminar seal" is to be understood in this description as an arrangement of singly or multiply wound laminar rings, which can be installed at the sealing point by spiral insertion into a groove. A laminar seal acts as a labyrinth seal, which combines a non-contact or low-contact labyrinth with very small gap widths. As a rule a laminar seal has metallic laminar rings, which operate very precisely (e.g. dressed to size and/or lobed). Laminar seals are manufactured by Fey Lamellenringe GmbH & Co. KG, 86343 Königsbrunn, Germany, for example.

The seal arrangement has a dust protection cover connected to the second component, which is arranged radially outside the first labyrinth seal, relative to the axis of rotation.

The invention involves a triple, non-contact sealing system: the inventive seal arrangement comprises a combination of a labyrinth seal and a laminar seal arranged downstream of the labyrinth seal in the direction in which the dust enters, characterized in that the seal also comprises a dust protection cover, which covers the entry gap of the labyrinth seal. Thus a dust protection cover has been added to the known combination of labyrinth seal and laminar seal. This has the technical effect that the entry of dust from a dusty environment into the sealing gap is prevented if the grease lubrication of the labyrinth seal is no longer provided. Thus a lack of grease lubrication of the labyrinth seal, caused for example by non-adherence to the prescribed lubrication intervals, does not lead to an undesired entry of dust into the interior of a device sealed by the seal, e.g. a gear or a motor.

This seal arrangement is advantageously able to be used in gears, e.g. in planetary gears, in particular of gear systems that are used in dusty environments such as mining applications.

Advantageous embodiments and developments of the invention are specified in the dependent claims.

Preferably all labyrinth seals of the seal arrangement are completely filled with grease, in particular the path from the radial innermost end of the dust protection cover through to the laminar seal.

Preferably the dust protection cover, the first labyrinth seal and the laminar seal are arranged in this order one after the other in the seal arrangement, viewed in the direction of a through-hole through the seal arrangement from a dusty environment through to the radial gap to be sealed. A dust particle intruding into the seal arrangement would thus have to pass the dust protection cover, the first labyrinth seal and the laminar seal in that order, before it is able to reach the radial gap. This shows how reliably the present seal arrangement provides a seal against a dusty environment.

Preferably an annular gap is embodied between the dust protection cover and the dynamic sealing part, which rises radially outwards, viewed in the direction of a through-hole through the seal arrangement from a dusty environment through to the radial gap to be sealed. In this way a dust particle intruding into the seal arrangement, after it has got into the annular gap formed between the dust protection cover and the dynamic sealing part, would have to move through the annular gap. The annular gap acts as a labyrinth seal and is preferably filled with grease; therefore it is very unlikely for a dust particle to get through the annular gap and to intrude further into the seal arrangement. The conical design of the dust protection cover, because of the negative gradient to the inner first component, e.g. a shaft, prevents the intrusion of contamination.

Preferably the inner first component is a shaft, in particular a drive shaft or take-off shaft of a device of a drive train, e.g. of a gear or of a motor, preferably of an electric motor.

Preferably the outer second component is a bearing cover, i.e. a component for covering a bearing, e.g. a rolling-element or sliding-element bearing, in which a shaft is supported. The bearing cover can surround a shaft rotatable about an axis of rotation in a ring shape, but can even be fastened permanently to a gear or motor housing relative to the shaft. The first component is thus rotatable about an axis of rotation and the second component is arranged coaxially to the first component. The bearing cover can be installed with screws on the outer side of a gear or motor housing. The bearing cover is preferably made from a metallic material.

Arranged after the laminar seal and before the radial gap to be sealed, viewed in the direction of a through-hole through the seal arrangement from a dusty environment through to the radial gap to be sealed, is a shaft sealing ring, preferably a radial shaft sealing ring, which is permanently connected to the second component and of which the sealing lip rests against the inner first component. Preferably the shaft sealing ring is arranged immediately before the radial gap, viewed in the direction of the entry of dust. The shaft sealing ring has a sealing lip, which rests against the inner first component. The shaft sealing ring can serve to prevent an escape of a low-viscosity lubricant, such as e.g. an oil, from the drive component, e.g. a gear or a motor, through the radial gap in the direction of the dusty environment. The shaft sealing ring serves in particular to prevent an escape of gear oil from a gear along a gear shaft. Thus the multiple sealing system not only acts against the entry of dust, but also against the escape of low-viscosity lubricants, such as e.g. oils.

The invention involves a triple seal system, to protect the downstream shaft sealing ring from damage. Above and beyond this, in the event of a possible wear-related failure of the shaft sealing ring, contamination is to be prevented from being able to intrude into the drive components.

Preferably the seal arrangement has a second labyrinth seal between the laminar seal and the shaft sealing ring. This second labyrinth seal can likewise be filled with grease.

In the seal arrangement the dust protection cover covers the entry gap of the labyrinth seal facing towards a dusty environment in a non-contact manner. Preferably a further, third labyrinth seal, which can likewise be filled with grease, is embodied between the dust protection cover and a component covered by the dust protection cover, be it a component connected to the first component or a component connected to the second component.

According to another aspect of the invention, the object is also achieved by a device, such as a gear or a preferably electric motor, with a shaft, a bearing cover surrounding the shaft and a seal arrangement as set forth above, wherein the dust protection cover is fastened to the bearing cover.

Preferably the outer diameter of the dust protection cover reduces, viewed in the axial direction away from the bearing cover. The conical design of the dust protection cover, because of the negative gradient to the inner first component, e.g. a shaft, prevents the intrusion of dirt.

Preferably a shrink disk is arranged on the shaft, wherein the seal arrangement is arranged in an axial space between the bearing cover and the shrink disk.

Preferably the invention involves the following subject matter: A gear with a gear housing and a shaft projecting from the gear housing, a bearing cover surrounding the gear shaft, arranged coaxially to the gear shaft and a seal arrangement for sealing a radial gap between the gear shaft and the bearing cover, which are rotatable relative to one another, wherein the gear shaft is rotatable about an axis of rotation, wherein the seal arrangement has a dynamic sealing ring, which is installed permanently on the gear shaft, wherein the seal arrangement has a static sealing ring, which is installed permanently on the bearing cover, wherein the seal arrangement has a first labyrinth seal filled with grease, which is formed by a gap between a first section of opposing surfaces of the dynamic sealing ring and the static sealing ring, wherein the seal arrangement has a laminar seal, which is arranged radially within the first labyrinth seal, wherein the seal arrangement has a dust protection cover installed permanently on the bearing cover, which is arranged radially outside the first labyrinth seal, wherein the dust protection cover, the first labyrinth seal and the laminar seal are arranged in this order one after the other in the seal arrangement, viewed in the direction of a through-hole through the seal arrangement from a dusty environment through to the radial gap to be sealed, wherein a ring-shaped gap is embodied between the dust protection cover and the dynamic sealing ring, which increases radially outwards, viewed in the direction of a through-hole through the seal arrangement from a dusty environment through to the radial gap to be sealed, wherein a shaft sealing ring is arranged between the laminar seal and the radial gap to be sealed, viewed in the direction of a through-hole through the seal arrangement from a dusty environment through to the radial gap to be sealed, which is permanently arranged in the bearing cover and of which the sealing lip rests against a circumference of the gear shaft, wherein the seal arrangement has a second labyrinth seal between the laminar seal and the shaft sealing ring, wherein the dust protection cover covers the entry gap of the labyrinth seal facing towards a dusty environment in a non-contact manner, and wherein the laminar seal is an arrangement of singly or multiply wound laminar rings, which can be installed at the sealing point by spiral insertion into a groove.

According to still another aspect of the invention, the object is also achieved by a use of a seal arrangement as set forth above in a gear, in particular a planetary gear, for sealing a shaft of the gear.

BRIEF DESCRIPTION OF THE DRAWING

The invention will be explained below on the basis of a number of exemplary embodiments with the aid of the enclosed drawings. In the drawings, as schematics and not true-to-scale in each case:

FIG. 7 shows an inventive seal arrangement, which is embodied similarly to the arrangement in FIG. 4 and in which a V ring is inserted additionally into the labyrinth seal, FIG. 8 shows an inventive seal arrangement, in which the dust protection cover is embodied as a separate component.

DETAILED DESCRIPTION OF PREFERRED EMBODIMENTS

Figure 1:
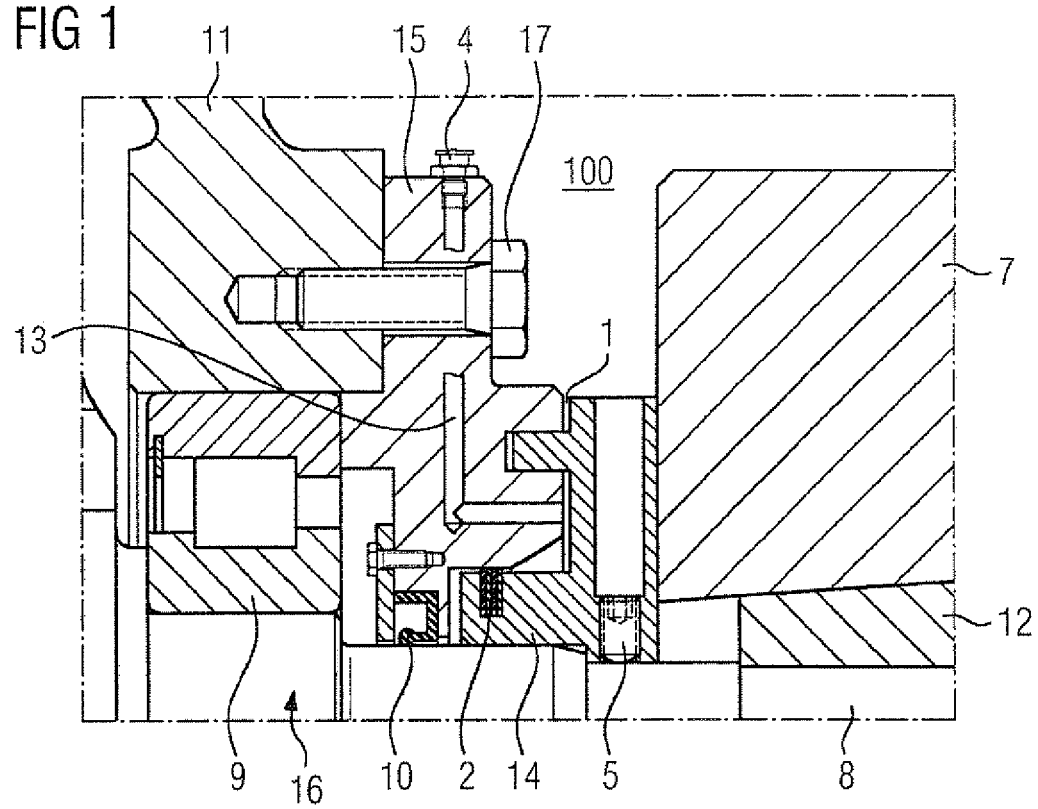
FIG. 1 shows a non-inventive seal arrangement with a labyrinth seal and a laminar seal.

The constructions shown in FIGS. 2 to 9 are similar in the area of the gear and the shrink connection to the construction shown in FIG. 1. To this extent the reader is referred to FIG. 1 with regard to the more detailed explanation of the individual components.

FIG. 8 shows a preferred embodiment of the invention. By comparison with the construction shown in FIG. 1, the entry of the labyrinth seal 1 is shielded from the environment by a ring-shaped dust protection cover 3. Thus the likelihood of dust reaching the entry area of the labyrinth seal 1 is reduced. Moreover dust particles getting from the environment 100 to the seal will be transported away from the gear 16 by the conical shape of the dust protection cover 3. Thus the likelihood of dust getting into the entry area of the labyrinth seal 1 is further reduced. The dust protection cover 3 is fastened by screws to the non-rotating component 15, a bearing cover. Even if dust should get into the annular, gap 19 between the dust protection cover 3 and the rotating component 14, each dust particle must first be transported along the annular gap 19 before it would get into the labyrinth seal 1.

The rings of the laminar seal 2 are held by a screw 20 in the rotating component 14. The grease pressed into the labyrinth seal 1 is preferably Lithium grease. Preferably a number of lubrication nipples, provided for pressing grease into the labyrinth seal 1, are distributed over the outer circumference of the non-rotating component 15, e.g. four nipples distributed evenly over the circumference.

Figure 9:
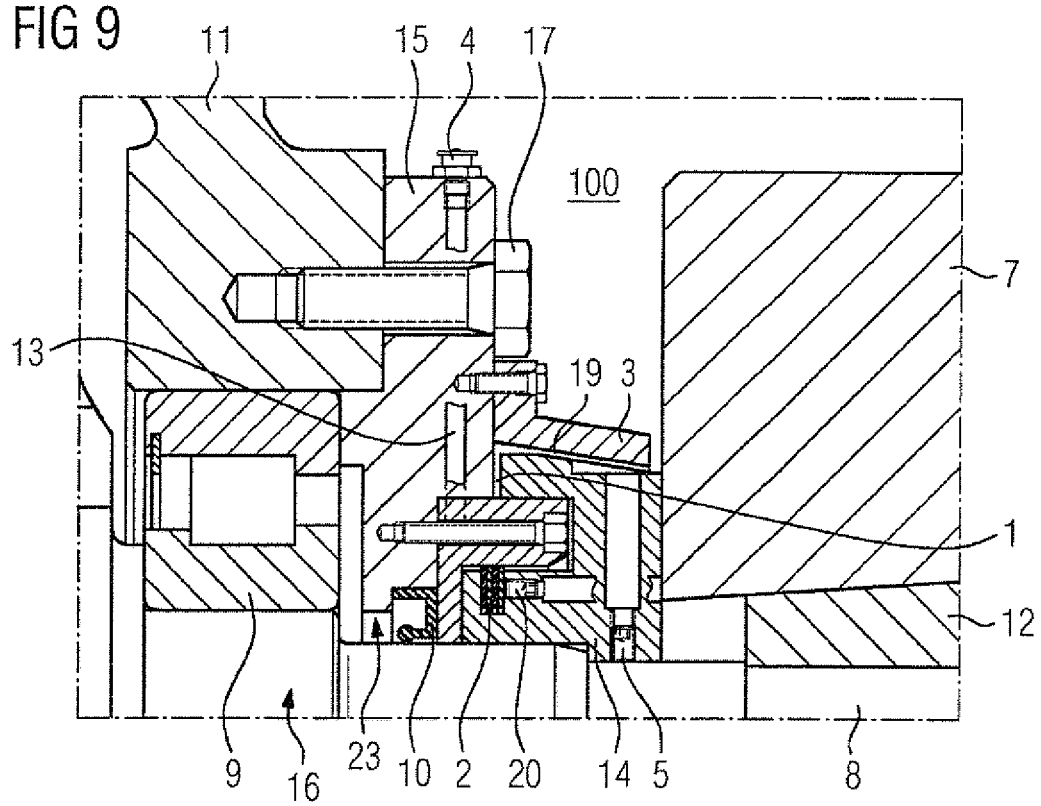
FIG. 9 shows an inventive seal arrangement with a construction essentially the same as that shown in FIG. 8, but with a slightly changed shoulder on the static sealing part.

FIG. 9 shows an alternate embodiment of the invention, in which the shoulder 23 of the non-rotating component 15 arranged towards the inside of the gear, against which the shaft sealing ring 10 rests facing towards the gear 16, is pulled radially less far towards the drive shaft 8 than the construction shown in FIG. 8. The dust protection cover 3 is designed similarly to the cover in FIG. 8.

Figure 2:
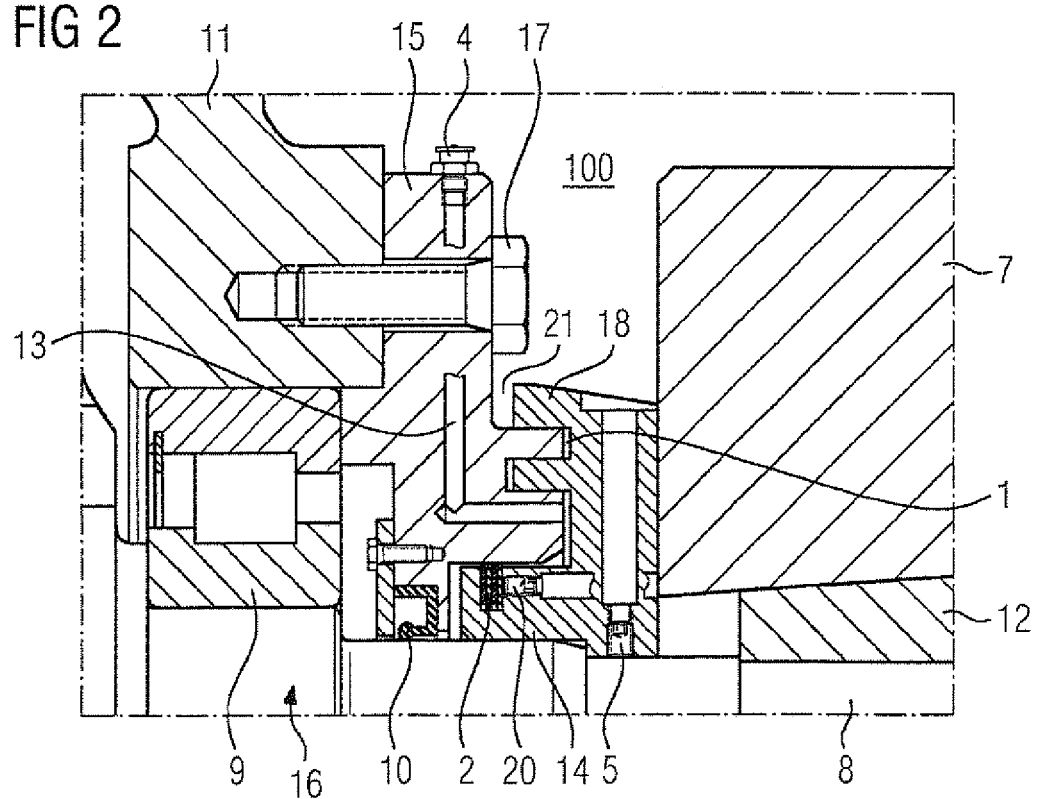
FIG. 2 shows a non-inventive seal arrangement, in which a covering element connected to the first component is used for covering the labyrinth seal.

FIG. 2 shows a non-inventive seal arrangement, namely a combination of a labyrinth seal 1 and laminar seal 2 arranged downstream in the direction of the entry of dust into the labyrinth seal. By comparison with the construction shown in FIG. 1, the rotating component 14 has a cover element 18 on its outer circumference, which covers the entry area of the labyrinth seal 1 and functions as a dust protection cover of the labyrinth seal. In this case the outer circumference of the cover element 18 is embodied conical, so that dust particles reaching the seal from the environment 100 are transported away from the gear 16 by the conical shape of the cover element 18. Embodied between the cover element 18 and the non-rotating component 15 is a bead 21.

Figure 3:
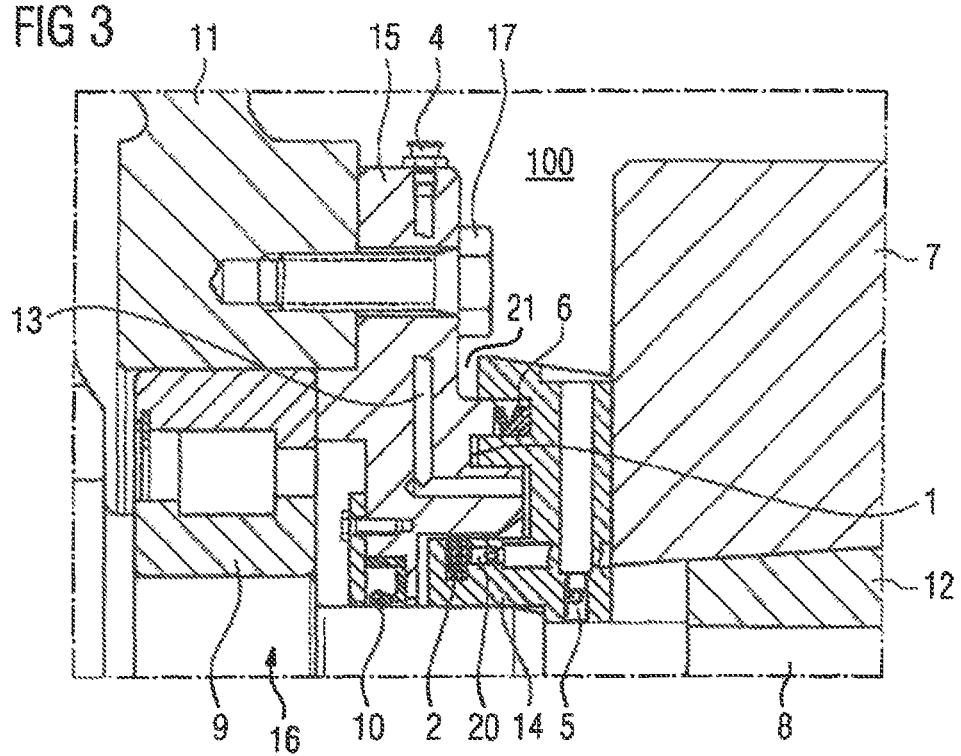
FIG. 3 shows a non-inventive seal arrangement, in which a covering element connected to the first component is used for covering the labyrinth seal and a V ring is used.

FIG. 3 shows a further non-inventive seal arrangement, namely a combination of a labyrinth seal, a V ring and a laminar seal arranged downstream in the direction of dust entry into the labyrinth seal. By comparison with the construction shown in FIG. 2, a V ring 6 is additionally inserted into the end of the labyrinth seal 1 facing towards the environment 100. The cover element of the rotating component 14 as embodied in FIG. 2 functions as the dust protection cover of the labyrinth seal.

Figure 4:
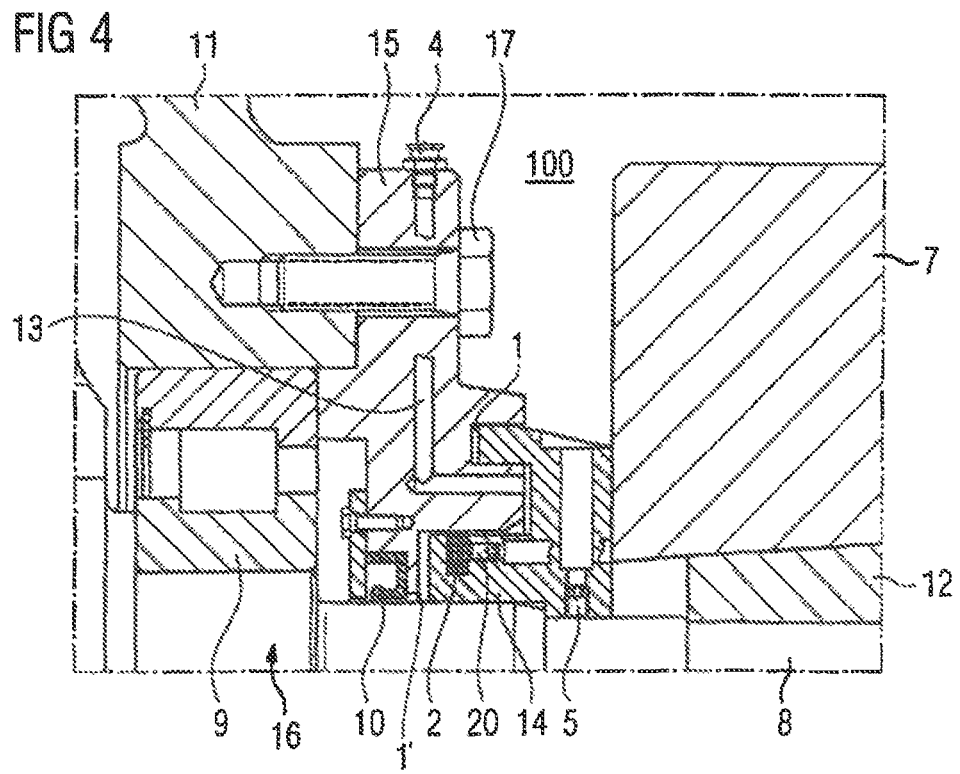
FIG. 4 shows an inventive seal arrangement, in which the dust protection cover is integrated into the second component.

FIG. 4 shows a further inventive seal arrangement, namely a combination of a labyrinth seal 1 and a laminar seal 2 arranged downstream in the direction of dust entry into the labyrinth seal 1, as well as a second labyrinth seal 1' between the laminar seal 2 and the shaft sealing ring 10. By comparison with the construction shown in FIG. 2, the rotating component 14 is embodied on its outer circumference so that no bead is formed. A projecting rib of the non-rotating component 15 functions as the dust protection cover of the labyrinth seal.

Figure 5:
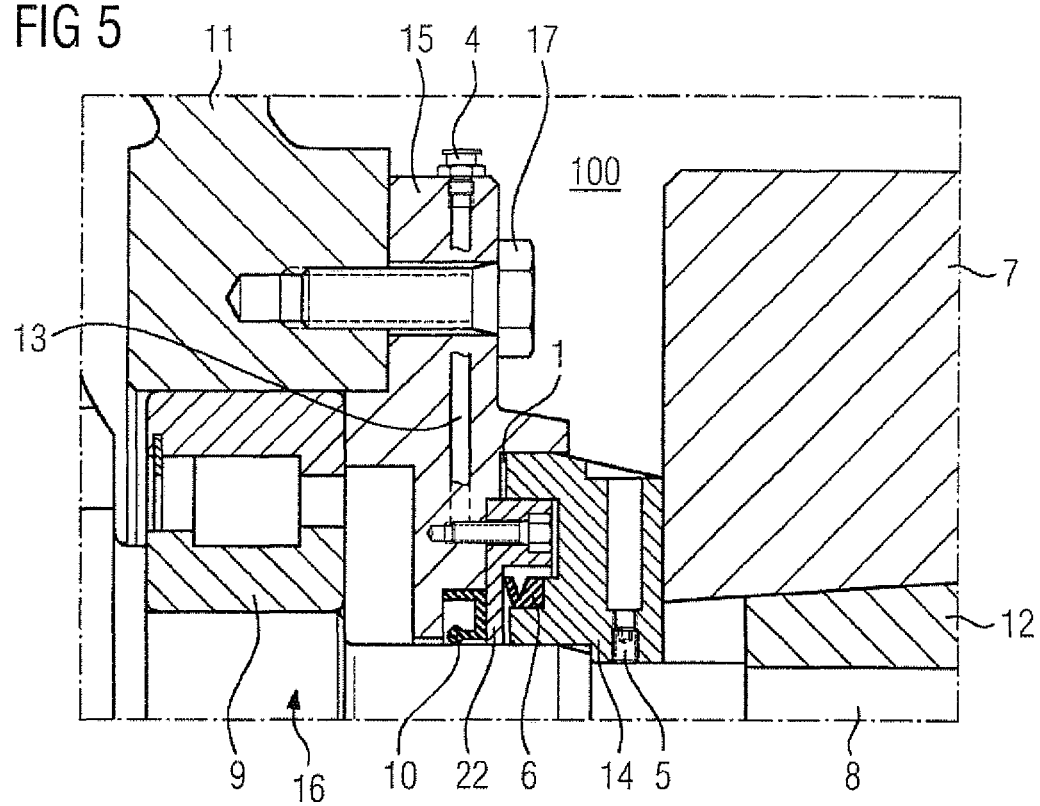
FIG. 5 shows a non-inventive seal arrangement, in which the laminar seal is replaced by a V ring.

FIG. 5 shows a further non-inventive seal arrangement, namely a combination of a labyrinth seal and a V ring. By comparison with the construction shown in FIG. 4, the laminar seal is replaced by a V ring 6. The shaft sealing ring 10, on its side facing away from the gear, is held by a further separate component. This construction permits a simpler change of the shaft sealing ring 10. A projecting rib of the non-rotating component 15 functions as the dust protection cover of the labyrinth seal.

Figure 6:
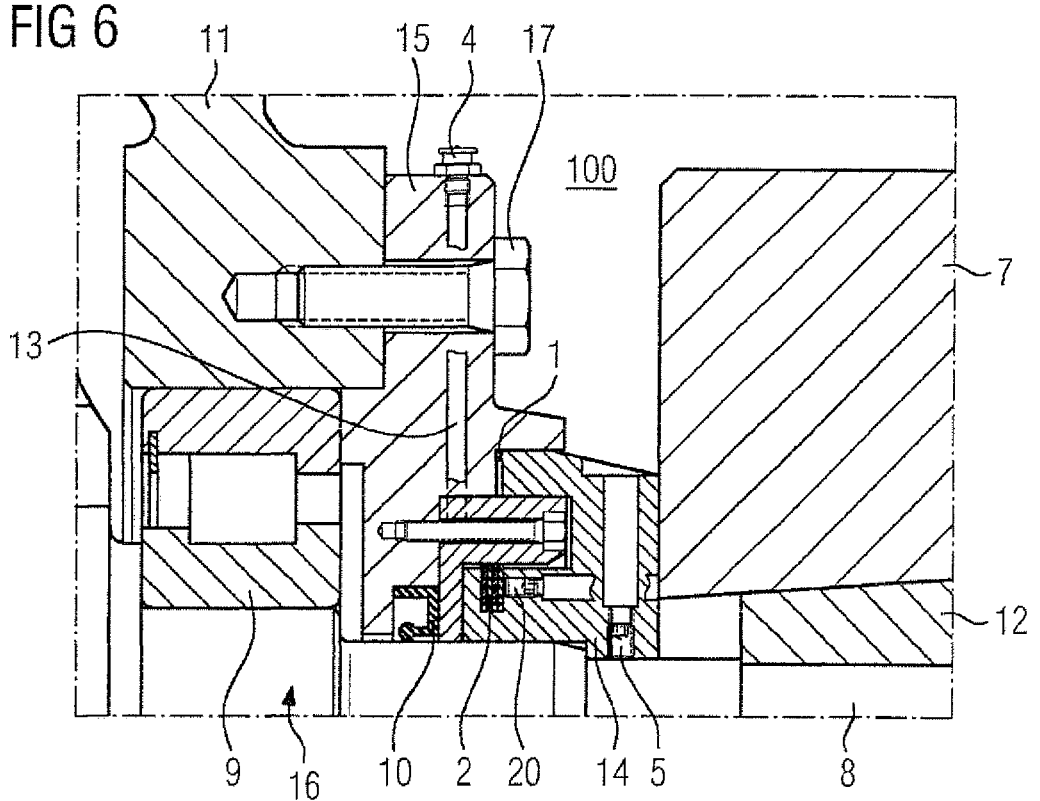
FIG. 6 shows an inventive seal arrangement, which is embodied similarly to the arrangement in FIG. 5, but in which a laminar seal is used instead of the V ring.

FIG. 6 shows a further inventive seal arrangement, namely a combination of a labyrinth seal and a laminar seal arranged downstream of the labyrinth seal in the direction of the dust entry. By comparison with the construction shown in FIG. 5, the V ring is replaced by a laminar seal 2. A projecting rib of the non-rotating component 15 functions as the dust protection cover of the labyrinth seal.

FIG. 7 shows a further inventive seal arrangement, namely a combination of a labyrinth seal 1, a V ring 6 and a laminar seal 2 arranged downstream of the labyrinth seal 1 in the direction of the dust entry. By comparison with the construction shown in FIG. 6, a V ring 6 is additionally inserted in the end of the labyrinth seal 1 facing towards the environment 100. A projecting rib of the non-rotating component 15 functions as the dust protection cover of the labyrinth seal.

What is claimed is:

1. A seal arrangement for sealing a radial gap between an inner first component and an outer second component, which are rotatable relative to one another, with the first component being arranged for rotation about an axis of rotation and the second component being arranged in coaxial relation to the first component, said seal arrangement comprising:
   a dynamic sealing part connected to the first component;
   a static sealing part connected to the second component;
   a first labyrinth seal formed by a gap between a first section of opposing surfaces of the dynamic sealing part and the static sealing part;
   a laminar seal arranged radially within the first labyrinth seal;
   a dust protection cover connected radially to the second component and arranged radially outside the first labyrinth seal; and
   a shaft sealing ring held by a further separate component on a side facing the laminar seal and arranged between the laminar seal and the radial gap, when viewed in a direction of a through-hole through the seal arrangement from a dusty environment to the radial gap, said shaft sealing ring being permanently connected to the second component and having a sealing lip which rests against the inner first component.

2. The seal arrangement of claim 1, wherein the dust protection cover, the first labyrinth seal and the laminar seal are arranged successively in the seal arrangement, when viewed in a direction of a through-hole through the seal arrangement from a dusty environment to the radial gap.

3. The seal arrangement of claim 1, wherein the radial gap is an annular gap defined by the dust protection cover and the dynamic sealing part, when viewed in a direction of a through-hole through the seal arrangement from a dusty environment to the radial gap.

4. The seal arrangement of claim 1, wherein the inner first component is a shaft.

5. The seal arrangement of claim 1, wherein the outer second component is a bearing cover.

6. The seal arrangement of claim 1, further comprising a second labyrinth seal between the laminar seal and the shaft sealing ring.

7. The seal arrangement of claim 1, wherein the first labyrinth seal is filled with grease.

8. The seal arrangement of claim 1, wherein the labyrinth seal has an entry gap which faces towards a dusty environment in a non-contact manner, said dust protection cover covering the entry gap of the labyrinth seal.

9. The seal arrangement of claim 1, wherein the laminar seal is an arrangement of multiply wound lamella rings configured such as to enable installation at sealing point by insertion as spirals.

10. The seal arrangement of claim 1, constructed for use in a gear, in particular a planetary gear, for sealing a shaft of the gear.

11. A device, such as a gear or motor, comprising:
    a shaft;
    a bearing cover in surrounding relation to the shaft;
    a seal arrangement for sealing a radial gap between an inner first component and an outer second component, which are rotatable relative to one another, said seal arrangement comprising a dynamic sealing part connected to the first component, a static sealing part connected to the second component, a first labyrinth seal formed by a gap between a first section of opposing surfaces of the dynamic sealing part and the static sealing part, a laminar seal arranged radially within the first labyrinth seal, and a dust protection cover connected radially to the second component and arranged radially outside the first labyrinth seal, said dust protection cover being fastened to the bearing cover; and
    wherein the seal arrangement includes a shaft sealing ring held by a further separate component on a side facing the laminar seal and arranged between the laminar seal and the radial gap, when viewed in a direction of a through-hole through the seal arrangement from a dusty environment to the radial gap, said shaft sealing ring being permanently connected to the second component and having a sealing lip which rests against the inner first component.

12. The device of claim 11, wherein the dust protection cover has an outer circumference which decreases in an axial direction away from the bearing cover.

13. The device of claim 11, further comprising a shrink disk arranged on the shaft, said seal arrangement being arranged in an axial space between the bearing cover and the shrink disk.

14. The device of claim 11, wherein the dust protection cover, the first labyrinth seal and the laminar seal are arranged successively in the seal arrangement, when viewed in a direction of a through-hole through the seal arrangement from a dusty environment to the radial gap.

15. The device of claim 11, wherein the radial gap is an annular gap defined by the dust protection cover and the dynamic sealing part, when viewed in a direction of a through-hole through the seal arrangement from a dusty environment to the radial gap.

16. The device of claim 11, wherein the seal arrangement includes a second labyrinth seal between the laminar seal and the shaft sealing ring.

17. The device of claim 11, wherein the first labyrinth seal is filled with grease.

18. The device of claim 11, wherein the labyrinth seal has an entry gap which faces towards a dusty environment in a non-contact manner, said dust protection cover covering the entry gap of the labyrinth seal.

19. The device of claim 11, wherein the laminar seal is an arrangement of multiply wound lamella rings configured such as to enable installation at sealing point by insertion as spirals.

\* \* \* \* \*